US011558993B2

(12) United States Patent
Kovach (10) Patent No.: US 11,558,993 B2
(45) Date of Patent: Jan. 24, 2023

(54) SOIL MONITORING SYSTEM FOR AN AGRICULTURAL TILLAGE IMPLEMENT

(71) Applicant: CNH Industrial America LLC, New Holland, PA (US)

(72) Inventor: Michael George Kovach, Morton, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 488 days.

(21) Appl. No.: 16/830,331

(22) Filed: Mar. 26, 2020

(65) Prior Publication Data

US 2021/0298221 A1    Sep. 30, 2021

(51) Int. Cl.
| | |
|---|---|
| A01B 79/00 | (2006.01) |
| A01B 49/02 | (2006.01) |
| A01B 59/00 | (2006.01) |
| A01B 63/16 | (2006.01) |
| A01B 76/00 | (2006.01) |
| G01B 21/30 | (2006.01) |

(52) U.S. Cl.
CPC ............ *A01B 79/005* (2013.01); *A01B 49/02* (2013.01); *A01B 59/002* (2013.01); *A01B 63/16* (2013.01); *A01B 76/00* (2013.01); *G01B 21/30* (2013.01)

(58) Field of Classification Search
CPC .. A01B 63/111; A01B 63/1112; A01B 79/005
See application file for complete search history.

(56) References Cited

U.S. PATENT DOCUMENTS

| | | | |
|---|---|---|---|
| 3,642,087 | A | 2/1972 | Sampey |
| 4,413,685 | A | 11/1983 | Gremelspacher et al. |
| 4,491,183 | A | 1/1985 | Anderson et al. |
| 4,679,633 | A | 7/1987 | Kauss |

(Continued)

FOREIGN PATENT DOCUMENTS

| | | |
|---|---|---|
| CN | 105783839 | 7/2016 |
| CN | 109588075 | 4/2019 |

(Continued)

OTHER PUBLICATIONS

EP Application No. 19171136.5 Extended European Search Report dated Nov. 6, 2019, 22 pgs.

(Continued)

*Primary Examiner* — Gary S Hartmann
(74) *Attorney, Agent, or Firm* — Rebecca Henkel; Rickard DeMille (57) ABSTRACT

A soil monitoring system for an agricultural tillage implement includes a sensor configured to be coupled to a frame of the agricultural tillage implement. The sensor is configured to be directed toward a region of a soil surface. In addition, the sensor is configured to emit an output signal toward the region of the soil surface and to receive a return signal indicative of a profile of the soil surface within the region. Furthermore, the soil monitoring system includes a controller configured to identify a rough soil profile in response to determining that at least one variation in the profile of the soil surface within the region is greater than a first threshold value, and/or in response to determining that a number of variations in the profile of the soil surface within the region is greater than a second threshold value.

20 Claims, 3 Drawing Sheets

(56) References Cited

U.S. PATENT DOCUMENTS

| | | | |
|---|---|---|---|
| 4,775,940 | A | 10/1988 | Nishida et al. |
| 4,776,153 | A | 10/1988 | DePauw et al. |
| 5,060,205 | A | 10/1991 | Phelan |
| 5,430,651 | A | 7/1995 | Nielsen et al. |
| 5,488,817 | A | 2/1996 | Paquet et al. |
| 5,535,577 | A | 7/1996 | Chmielewski et al. |
| 5,621,666 | A | 4/1997 | O'Neall et al. |
| 5,711,139 | A | 1/1998 | Swanson |
| 5,794,421 | A | 8/1998 | Maichle |
| 6,076,611 | A | 6/2000 | Rozendaal et al. |
| 6,089,327 | A | 7/2000 | Kimura et al. |
| 6,131,919 | A | 10/2000 | Lee et al. |
| 6,164,385 | A | 12/2000 | Buchi |
| 6,216,794 | B1 | 4/2001 | Buchi |
| 6,222,628 | B1 | 4/2001 | Gorallo et al. |
| 6,305,478 | B1 | 10/2001 | Friggstad |
| 6,588,187 | B2 | 7/2003 | Englestad et al. |
| 6,698,524 | B2 | 3/2004 | Bernhardt et al. |
| 6,813,873 | B2 | 11/2004 | Allwörden et al. |
| 6,990,390 | B2 | 1/2006 | Groth et al. |
| 7,028,554 | B2 | 4/2006 | Adamchuk et al. |
| 7,063,167 | B1 | 6/2006 | Staszak et al. |
| 7,540,129 | B2 | 6/2009 | Kormann |
| 7,540,130 | B2 | 6/2009 | Coers et al. |
| 7,748,264 | B2 | 7/2010 | Prem |
| 7,866,671 | B2 | 1/2011 | Madler |
| 7,870,709 | B2 | 1/2011 | Digman |
| 8,573,319 | B1 | 11/2013 | Casper et al. |
| 8,720,170 | B2 | 5/2014 | Deneault et al. |
| 8,751,147 | B2 | 6/2014 | Colwell |
| 8,752,642 | B2 | 6/2014 | Whalen et al. |
| 8,827,001 | B2 | 9/2014 | Wendte et al. |
| 8,843,283 | B2 | 9/2014 | Strelioff et al. |
| 8,857,530 | B2 | 10/2014 | Henry |
| RE45,303 | E | 12/2014 | Henry et al. |
| 8,977,441 | B2 | 3/2015 | Grimes et al. |
| 9,026,321 | B2 | 5/2015 | Henry et al. |
| 9,301,439 | B2 | 4/2016 | Gilstring |
| 9,351,443 | B2 | 5/2016 | Miller et al. |
| 9,405,039 | B2 | 8/2016 | Anderson |
| 9,481,294 | B2 | 11/2016 | Sauder et al. |
| 9,510,498 | B2 | 12/2016 | Tuttle et al. |
| 9,516,802 | B2 | 12/2016 | Zemenchik |
| 9,554,098 | B2 | 1/2017 | Casper et al. |
| 9,554,504 | B2 | 1/2017 | Houck |
| 9,585,298 | B2 | 3/2017 | Henry et al. |
| 9,585,307 | B2 | 3/2017 | Holland |
| 9,693,496 | B2 | 7/2017 | Tevs et al. |
| 9,706,696 | B2 | 7/2017 | Gschwendtner |
| 9,750,174 | B2 | 9/2017 | Sauder et al. |
| 9,801,329 | B2 | 10/2017 | Zielke |
| 9,861,022 | B2 | 1/2018 | Bassett |
| 9,980,422 | B2 | 5/2018 | Czapka et al. |
| 10,045,474 | B2 | 8/2018 | Bachman et al. |
| 10,104,822 | B2 | 10/2018 | Couchman |
| 10,123,475 | B2 | 11/2018 | Posselius et al. |
| 10,178,823 | B2 | 1/2019 | Kovach et al. |
| 10,219,421 | B2 | 3/2019 | Achen et al. |
| 10,820,476 | B2 | 11/2020 | Stoller et al. |
| 10,845,810 | B2* | 11/2020 | Flajolet ............... G06V 20/188 |
| 11,385,338 | B2* | 7/2022 | Stanhope ................ G01S 7/497 |
| 2010/0017075 | A1 | 1/2010 | Beajuot |
| 2012/0227992 | A1 | 9/2012 | Henry |
| 2013/0068489 | A1 | 3/2013 | Blunier et al. |
| 2016/0029547 | A1 | 2/2016 | Casper et al. |
| 2017/0064900 | A1 | 3/2017 | Zemenchik |
| 2017/0105331 | A1 | 4/2017 | Herlitzius et al. |
| 2017/0251587 | A1 | 9/2017 | Sporrer et al. |
| 2018/0114305 | A1 | 4/2018 | Strnad et al. |
| 2018/0153088 | A1 | 6/2018 | Sporrer et al. |
| 2018/0220577 | A1 | 8/2018 | Posselius et al. |
| 2018/0279543 | A1 | 10/2018 | Kovach |
| 2018/0299422 | A1 | 10/2018 | Pregesbauer |
| 2018/0303022 | A1 | 10/2018 | Barrick et al. |
| 2018/0310465 | A1 | 11/2018 | Peterson et al. |
| 2018/0310466 | A1 | 11/2018 | Kovach et al. |
| 2018/0340845 | A1 | 11/2018 | Rhodes et al. |
| 2019/0008088 | A1 | 1/2019 | Posselius et al. |
| 2019/0059198 | A1 | 2/2019 | Schnaider et al. |
| 2019/0235529 | A1 | 8/2019 | Barrick et al. |
| 2019/0246548 | A1 | 8/2019 | Kovach et al. |
| 2020/0000005 | A1 | 1/2020 | Stanhope et al. |
| 2020/0060062 | A1 | 2/2020 | Sporrer et al. |
| 2020/0084954 | A1 | 3/2020 | Sporrer et al. |
| 2020/0093052 | A1 | 3/2020 | Preimess et al. |
| 2020/0100419 | A1 | 4/2020 | Stanhope |
| 2020/0278680 | A1* | 9/2020 | Schulz ................. G05D 1/0257 |
| 2020/0337206 | A1 | 10/2020 | Hertzog et al. |
| 2020/0359542 | A1* | 11/2020 | Bögel .................... A01B 33/02 |
| 2021/0045280 | A1 | 2/2021 | Ehlert et al. |
| 2021/0084804 | A1* | 3/2021 | Stanhope ............ A01B 63/1112 |
| 2021/0089027 | A1* | 3/2021 | Dasika ................ G06F 3/04845 |
| 2021/0092892 | A1 | 4/2021 | Pregesbauer |
| 2021/0227743 | A1* | 7/2021 | Henry .................. A01B 49/027 |
| 2021/0259149 | A1* | 8/2021 | Zemenchik .......... A01B 79/005 |
| 2021/0307236 | A1* | 10/2021 | Strnad .................... A01C 5/064 |

FOREIGN PATENT DOCUMENTS

| | | |
|---|---|---|
| EP | 1273216 | 1/2003 |
| EP | 3305052 | 4/2018 |
| JP | H02167004 | 6/1990 |
| JP | 2969808 | 11/1999 |
| JP | H11321634 | 11/1999 |
| JP | 2022165510 | 6/2002 |
| JP | 2005095045 | 4/2005 |
| WO | 2017158006 | 9/2017 |
| WO | WO2017197274 | 11/2017 |
| WO | WO2018018050 | 1/2018 |
| WO | 2019158454 | 8/2019 |

OTHER PUBLICATIONS

EP Application No. 21165028.8 Extended Search Report, dated Dec. 10, 2021, 13 pgs.

EP Application No. 21165022.1, Search Report dated Aug. 6, 2021, 8 pgs.

EP Application No. 21165029.6, Search Report dated Aug. 6, 2021, 7 pgs.

EP Application No. 21165028.8, Search Report dated Aug. 9, 2021, 14 pgs.

EP Application No. 21165025.4, Search Report dated Aug. 6, 2021, 9 pgs.

Gilliot et al., "Soil Surface Roughness Measurement: A New Fully Automatic Photogrammetric Approach Applied to Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.

Hart-Carter Co., "Automatice Header Adjustment," Farm Show Magazine, 1984, p. 33, vol. #8 , Issue #6.

Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.

Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.

Peteinatos et al., "Precision Harrowing With a Flexible Tine Harrow and an Ultrasonic Sensor," Jul. 2015, Precision Agricultural, pp. 579-586, https://www.researchgate.net/publication/281437517_Precision_harrowing_with_a_lexible_tine_harrow_and_an_ultrasonic_sensor.

"Tiger-Mate® 255 Field Cultivator," 2017, Case IH Agriculture, 24 pgs.

"Ecolo-Tiger® 875 Disk Ripper," 2018, Case IH Agriculture, 16 pgs.

(56) References Cited

OTHER PUBLICATIONS

U.S. Appl. No. 16/830,531, filed Mar. 26, 2020, Michael George Kovach.
U.S. Appl. No. 16/830,335, filed Mar. 26, 2020, Michael George Kovach.
U.S. Appl. No. 16/830,344, filed Mar. 26, 2020, Michael George Kovach.
U.S. Appl. No. 16/830,410, filed Mar. 26, 2020, Michael George Kovach.

* cited by examiner

SOIL MONITORING SYSTEM FOR AN AGRICULTURAL TILLAGE IMPLEMENT

BACKGROUND

The present disclosure relates generally to a soil monitoring system for an agricultural tillage implement.

Certain agricultural tillage implements include ground engaging tools configured to interact with the soil. For example, an agricultural tillage implement may include tillage points and/or disc blades configured to break up the soil for subsequent planting or seeding operations. While performing tillage operations, an operator may periodically stop the agricultural tillage implement and inspect the soil behind the agricultural tillage implement. The operator may then adjust various parameters associated with the tillage operation (e.g., the penetration depth of one or more ground engaging tools, the speed of the agricultural tillage implement through the field, etc.) based on the inspection to enhance the tillage operation. Unfortunately, the process of periodically stopping the agricultural tillage implement and performing the inspection may substantially delay the agricultural tillage operation, thereby reducing the efficiency of the tillage process.

BRIEF DESCRIPTION

In certain embodiments, a soil monitoring system for an agricultural tillage implement includes a sensor configured to be coupled to a frame of the agricultural tillage implement. The sensor is configured to be directed toward a region of a soil surface rearward of each ground engaging tool of the agricultural tillage implement along a direction of travel of the agricultural tillage implement. In addition, the sensor is configured to emit an output signal toward the region of the soil surface and to receive a return signal indicative of a profile of the soil surface within the region. Furthermore, the soil monitoring system includes a controller having a memory and a processor. The controller is communicatively coupled to the sensor, and the controller is configured to identify a rough soil profile in response to determining that at least one variation in the profile of the soil surface within the region is greater than a first threshold value, and/or in response to determining that a number of variations in the profile of the soil surface within the region is greater than a second threshold value. In addition, the controller is configured to output a monitoring signal in response to identifying the rough soil profile. Each vertical difference between a baseline soil profile and a respective point along the profile of the soil surface that is greater than a third threshold value corresponds to a respective variation in the profile of the soil surface.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
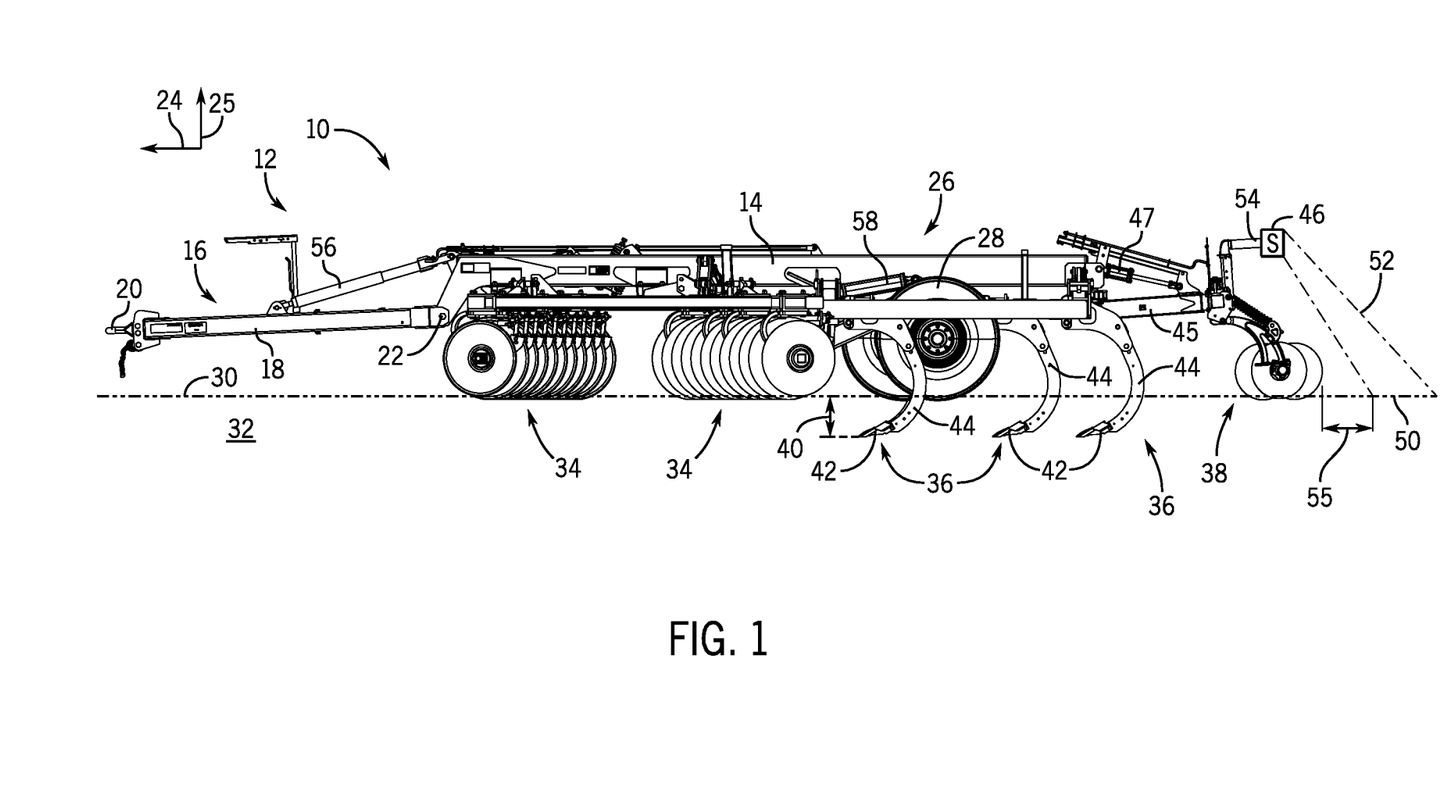
FIG. 1 is a side view of an embodiment of an agricultural tillage implement having a soil monitoring system.

FIG. 1 is a side view of an embodiment of an agricultural tillage implement 10 having a soil monitoring system 12. In the illustrated embodiment, the agricultural tillage implement 10 is a primary tillage implement having multiple ground engaging tools configured to till soil. As illustrated, the agricultural tillage implement 10 includes a frame 14 and a hitch assembly 16 coupled to the frame 14. The frame 14 is substantially rigid (e.g., does not include any translatable and/or rotatable components) and formed from multiple frame elements (e.g., rails, tubes, braces, etc.) coupled to one another (e.g., via welded connection(s), via fastener(s), etc.) The hitch assembly 16 includes a hitch frame 18 and a hitch 20. The hitch frame 18 is pivotally coupled to the implement frame 14 via pivot joint(s) 22, and the hitch 20 is configured to couple to a corresponding hitch of a work vehicle (e.g., tractor), which is configured to tow the agricultural tillage implement 10 through a field along a direction of travel 24. While the hitch frame 18 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move along a vertical axis 25 relative to the implement frame.

As illustrated, the agricultural tillage implement 10 includes wheel assemblies 26 movably coupled to the implement frame 14. In the illustrated embodiment, each wheel assembly 26 includes a wheel frame and a wheel 28 rotatably coupled to the wheel frame. The wheels 28 of the wheel assemblies 26 are configured to engage the surface 30 of the soil 32, and the wheel assemblies 26 are configured to support at least a portion of the weight of the agricultural tillage implement 10. In the illustrated embodiment, each wheel frame is pivotally coupled to the implement frame 14, thereby facilitating adjustment of the position of each wheel 28 along the vertical axis 25. However, in other embodiments, at least one wheel frame may be movably coupled to the implement frame by another suitable connection (e.g., sliding connection, linkage assembly, etc.) that facilitates adjustment of the vertical position of the respective wheel(s). In certain embodiments, the agricultural tillage implement may include two wheel assemblies 26. However, in other embodiments, the agricultural tillage implement may include more or fewer wheel assemblies (e.g., 1, 2, 3, 4, 5, 6, 7, 8, or more). In addition, each wheel assembly may include any suitable number of wheels (e.g., 1, 2, 3, 4, 5, 6, or more).

In the illustrated embodiment, the agricultural tillage implement 10 includes ground engaging tools, such as the illustrated disc blades 34, tillage point assemblies 36, and finishing discs 38. The disc blades 34 are configured to engage a top layer of the soil 32. As the agricultural tillage implement 10 is towed through the field, the disc blades 34 are driven to rotate, thereby breaking up the top layer. In the illustrated embodiment, the disc blades 34 are arranged in two rows. However, in alternative embodiments, the disc blades may be arranged in more or fewer rows (e.g., 1, 2, 3, 4, 5, 6, or more). In addition, the angle of each row relative to the direction of travel 24 may be selected and/or controlled to control the interaction of the disc blades 34 with the top layer of soil 32. The tillage point assemblies 36 are configured to engage the soil 32 at a greater depth 40, thereby breaking up a lower layer of the soil. Each tillage point assembly 36 includes a tillage point 42 and a shank 44. The shank 44 is configured to position the tillage point 42 at the depth 40 beneath the soil surface 30, and the tillage point 42 is configured to break up the soil. The shape of each tillage point 42, the arrangement of the tillage point assemblies 36, and the number of tillage point assemblies 36 may be selected to control tillage within the field. Furthermore, as the agricultural tillage implement 10 is towed through the field, the finishing discs 38 are driven to rotate, thereby sizing soil clods, leveling the soil surface, smoothing the soil surface, cutting residue on the soil surface, or a combination thereof In the illustrated embodiment, the finishing discs 38 are rotatably coupled to a finishing disc frame 45, and the finishing disc frame 45 is pivotally coupled to the implement frame 14. In addition, biasing member(s) 47 extend between the implement frame 14 and the finishing disc frame 45. The biasing member(s) 47 are configured to urge the finishing disc frame 45 toward the surface 30 of the soil 32, thereby driving the finishing discs 38 to engage the soil. While the finishing disc frame is pivotally coupled to the implement frame in the illustrated embodiment, in other embodiments, the finishing disc frame may be movable coupled to the implement frame by a linkage assembly (e.g., four bar linkage assembly, etc.) or another suitable assembly/mechanism that enables the finishing disc frame to move vertically relative to the implement frame. Furthermore, in certain embodiments, the finishing disc frame may be non-translatably and/or non-rotatably coupled to the implement frame, or the finishing disc frame may be omitted, and the finishing discs may be coupled to the implement frame.

While the illustrated agricultural tillage implement includes the disc blades 34, the tillage point assemblies 36, and the finishing discs 38, in other embodiments, the agricultural tillage implement may include other and/or additional ground engaging tool(s). For example, the disc blades, the tillage point assemblies, the finishing discs, or a combination thereof, may be omitted in certain embodiments. Furthermore, in certain embodiments, the agricultural tillage implement may include one or more other suitable ground engaging tools, such as coulter(s), reels(s), and tine(s), among other suitable ground engaging tools. Furthermore, while the agricultural tillage implement 10 is a primary tillage implement in the illustrated embodiment, in other embodiments, the agricultural tillage implement may be a vertical tillage implement, or another suitable type of agricultural tillage implement.

In the illustrated embodiment, the soil monitoring system 12 includes a sensor 46 coupled to the frame 14 of the agricultural tillage implement 10. As illustrated, the sensor 46 is directed toward a region 50 of the soil surface 30 rearward of the frame 14 along the direction of travel 24. The sensor 46 is configured to emit an output signal 52 toward the region 50 of the soil surface 30 and to receive a return signal indicative of a profile of the soil surface 30 within the region 50. The profile may be a two-dimensional profile of the soil surface within the region, or the profile may be a one-dimensional profile of the soil surface within the region that extends along a lateral axis of the agricultural tillage implement (e.g., perpendicular to the direction of travel of the agricultural tillage implement). While the soil monitoring system 12 includes a single sensor 46 in the illustrated embodiment, in other embodiments, the soil monitoring system may include additional sensors (e.g., 1, 2, 3, 4, 5, 6, 7, 8, or more).

In the illustrated embodiment, the sensor 46 is coupled to the implement frame 14 via the finishing disc frame 45, and the sensor 46 is coupled to the finishing disc frame 45 via a mount 54. The mount 54 positions the sensor 46 at a location that enables the sensor 46 to be directed toward the region 50. In the illustrated embodiment, the region 50 is positioned a distance 55 of at least 30 cm rearward of each ground engaging tool (e.g., each finishing disc 38) of the agricultural tillage implement 10 along the direction of travel 24. Accordingly, the amount of debris within the field of view of the sensor may be significant reduced (e.g., as compared to a sensor directed toward a region closer to the ground engaging tools). In other embodiments, the region may be positioned at least 20 cm, at least 40 cm, at least 50 cm, at least 60 cm, at least 70 cm, at least 80 cm, at least 90 cm, or at least 100 cm rearward of each ground engaging tool of the agricultural tillage implement. In addition, the position of the sensor 46 along the vertical axis 25 may be particularly selected to enable the field of view of the sensor to cover the region. Furthermore, while the region is positioned rearward of the sensor along the direction of travel in the illustrated embodiment, in other embodiments, the sensor may be positioned directly above the region and directed downwardly toward the region. In addition, while the sensor 46 is coupled to the implement frame 14 via the finishing disc frame 45 and the mount 54 in the illustrated embodiment, in other embodiments, the sensor may be coupled to the implement frame by any other suitable mounting assembly (e.g., a mount that extends between the implement frame and the sensor, etc.).

As discussed in detail below, the soil monitoring system 12 includes a controller communicatively coupled to the sensor 46. The controller is configured to identify a rough soil profile in response to determining that at least one variation in the profile of the soil surface within the region monitored by the sensor is greater than a first threshold value. Additionally or alternatively, the controller is configured to identify the rough soil profile in response to determining that a number of variations in the profile of the soil surface within the region monitored by the sensor is greater than a second threshold value. Each vertical difference between a baseline soil profile and a respective point along the profile of the soil surface that is greater than a third threshold value corresponds to a respective variation in the profile of the soil surface. Furthermore, the controller is configured to output a monitoring signal in response to identifying the rough soil profile. For example, in certain embodiments, the soil monitoring system includes a user interface communicatively coupled to the controller and configured to present an indication of the rough soil profile in response to receiving the monitoring signal. Accordingly, an operator may be informed as soon as the rough soil profile is detected, thereby enabling the operator to adjust operation of the agricultural tillage implement (e.g., reduce the speed of the agricultural tillage implement, adjust the penetration depth of one or more ground engaging tools of the agricultural tillage implement, etc.) to reduce the roughness of the soil profile. As such, the process of periodically stopping the agricultural tillage implement and manually inspecting the soil behind the agricultural tillage implement may be obviated, thereby increasing the efficiency of tillage operations.

In certain embodiments, the soil monitoring system 12 includes a first actuator 56 coupled to the implement frame 14 and to the hitch frame 18 of the hitch assembly 16. The first actuator 56 is configured to control a position of the hitch 20 of the hitch assembly 16 relative to the implement frame 14 along the vertical axis 25. While the orientation control system 12 includes a single first actuator 56 in the illustrated embodiment, in other embodiments, the orientation control system may include more first actuators extending between the implement frame and the hitch frame. Furthermore, while the first actuator 56 is coupled to the hitch frame 18 in the illustrated embodiment, in other embodiments, the first actuator may be coupled directly to the hitch or another suitable element of the hitch assembly. In addition, in certain embodiments, the soil monitoring system 12 includes a second actuator 58 coupled to the implement frame 14 and to the wheel frame of a respective wheel assembly 26. The second actuator 58 is configured to control a position of the respective wheel assembly 26 relative to the implement frame 14 along the vertical axis 25. In certain embodiments, the soil monitoring system 12 may include a single second actuator for each wheel assembly. In other embodiments, the soil monitoring system may include multiple second actuators for at least one wheel assembly, and/or the soil monitoring system may include a single second actuator for multiple wheel assemblies.

In certain embodiments, the controller, in response to identifying the rough soil profile, may output a control signal to the first and second actuators indicative of instructions to adjust a penetration depth of at least one ground engaging tool. For example, in response to identifying the rough soil profile, the controller may instruct the first actuator 56 and the second actuator 58 to lower the implement frame 14 relative to the soil surface 30, thereby increasing the penetration depth of the ground engaging tools. As a result, the ground engaging tools may increase the degree/magnitude of tillage, thereby reducing the roughness of the soil surface. While the controller is configured to output the control signal to the first and second actuators to control the penetration depth of at least one ground engaging tool in the illustrated embodiment, in other embodiments, the controller may be configured to output the control signal to one or more other suitable actuators to control the penetration depth of at least one ground engaging tool. For example, in certain embodiments, the hitch assembly may be coupled to the wheel assemblies by a mechanical linkage. Accordingly, a single actuator may control both the position of the hitch and the position of the wheel assemblies along the vertical axis. In such embodiments, the controller may output the control signal to the single actuator to control the penetration depth of the ground engaging tool(s). Furthermore, in certain embodiments, the first actuator may be omitted, and the hitch frame may freely move (e.g., rotate) relative to the implement frame. In such embodiments, the agricultural tillage implement may include one or more forward wheel assemblies (e.g., one or more gauge wheel assemblies), and an actuator may extend from the implement frame to each respective forward wheel assembly. Accordingly, the controller may output the control signal to each wheel actuator to control the penetration depth of the ground engaging tool(s).

Furthermore, in certain embodiments, the controller, in response to identifying the rough soil profile, may instruct one or more actuators to move certain ground engaging tools without changing the position of other ground engaging tools. For example, in certain embodiments, the controller may instruct an actuator (e.g., an actuator extending between the implement frame and a disc blade frame) to adjust the penetration depth of the disc blades without changing the penetration depth of the tillage point assemblies and the finishing discs to reduce the roughness of the soil profile. By way of further example, the controller may instruct an actuator (e.g., an actuator extending between the implement frame and the finishing disc frame) to adjust the penetration depth of the finishing discs without changing the penetration depth of the tillage point assemblies and the disc blades to reduce the roughness of the soil profile. In addition, the controller may adjust the penetration depth of one or more individual ground engaging tools in response to identifying the rough soil profile (e.g., in embodiments in which certain individual ground engaging tools are coupled to respective actuators). Furthermore, the controller, in response to identifying the rough soil profile, may instruct the first actuator and/or the second actuator to tilt the implement frame about the lateral axis of the agricultural tillage implement, thereby increasing the penetration depth of one or more ground engaging tools at a front portion of the agricultural tillage implement or increasing the penetration depth of one or more ground engaging tools at a rear portion of the agricultural tillage implement. For example, in certain embodiments, the controller, in response to identifying the rough soil profile, may instruct the first actuator and/or the second actuator to lower the front portion of the implement frame, thereby increasing the penetration depth of the disc blades.

In certain embodiments, the controller may be configured to reduce the penetration depth (e.g., to the pre-adjustment penetration depth) of one or more ground engaging tools after a certain duration (e.g., to reduce the draft load on the work vehicle). In such embodiments, the controller may subsequently increase the penetration depth of the one or more ground engaging tools in response to identifying the rough soil profile. In addition, in certain embodiments, the controller may be configured to control other parameters associated with one or more ground engaging tools. For example, the controller may be configured to instruct an actuator to adjust the angle of the disc blades relative to the implement (e.g., to a more aggressive angle) in response to identifying the rough soil profile. In such embodiments, the controller may be configured to return the parameter(s) to the pre-adjustment value(s) after a certain duration (e.g., to reduce the draft load on the work vehicle).

In certain embodiments, each second actuator 58 is configured to move the respective wheel 28 from the illustrated raised position to a lowered position. While the wheels 28 are in the lowered position, the ground engaging tools of the agricultural tillage implement 10 are disengaged from the soil 32 (e.g., to facilitate transport and/or inspection of the agricultural tillage implement 10). Each second actuator 58 may lift the respective wheel 28 from the lowered position to the illustrated raised position, thereby causing the ground engaging tools to engage the soil 32. Once the ground engaging tools are engaged with the soil 32, the work vehicle may tow the agricultural tillage implement 10 throughout a field.

In certain embodiments, the agricultural tillage implement may include wing frames rotatably coupled to the implement frame. In such embodiments, each wing frame may support one or more ground engaging tools. In addition, a wheel assembly may be movably coupled to each wing frame, and at least one actuator may extend between each wheel assembly and the respective wing frame. Each actuator may be communicatively coupled to the controller. The controller may be configured to output a control signal to one or more actuators (e.g., the first actuator, the second actuator, one or more wing wheel assembly actuators) indicative of instructions to adjust the penetration depth of at least one ground engaging tool in response to identifying the rough soil profile.

Figure 2:
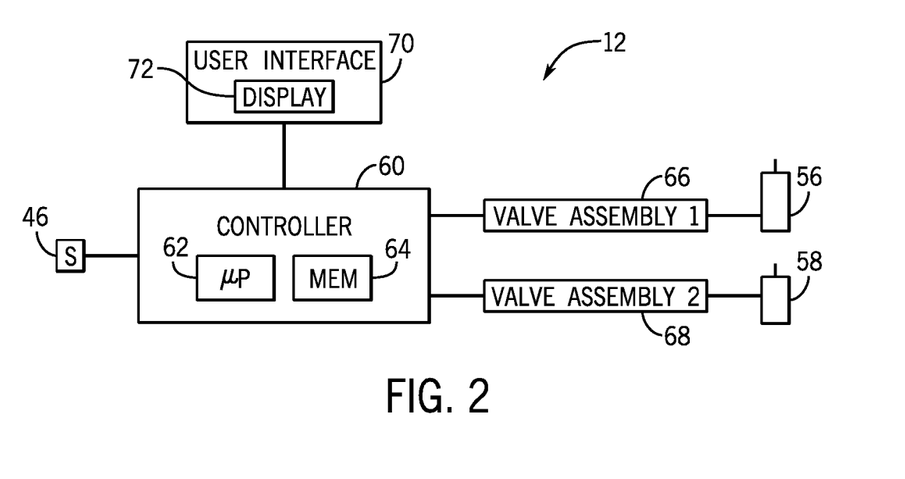
FIG. 2 is a schematic view of an embodiment of a soil monitoring system that may be employed within the agricultural tillage implement of FIG. 1.

FIG. 2 is a schematic view of an embodiment of a soil monitoring system 12 that may be employed within the agricultural tillage implement of FIG. 1. In the illustrated embodiment, the soil monitoring system 12 includes a controller 60 communicatively coupled to the sensor 46, to the first actuator 56, and to the second actuator 58. The controller 60 is configured to identify a rough soil profile based on feedback from the sensor 46. Furthermore, in certain embodiments, the controller, in response to identifying the rough soil profile, may control the first and/or second actuator to adjust a penetration depth of at least one ground engaging tool of the agricultural tillage implement. In the illustrated embodiment, the controller 60 is an element of the soil monitoring system 12 and may be located in/on the agricultural tillage implement. However, in other embodiments, the controller may be located in/on a work vehicle coupled to the agricultural tillage implement. Furthermore, in certain embodiments, one or more functions of the controller may be distributed across multiple control devices (e.g., the control devices forming the controller).

In certain embodiments, the controller 60 is an electronic controller having electrical circuitry configured to identify a rough soil profile. In the illustrated embodiment, the controller 60 includes a processor, such as the illustrated microprocessor 62, and a memory device 64. The controller 60 may also include one or more storage devices and/or other suitable components. The processor 62 may be used to execute software, such as software for identifying the rough soil profile, for controlling the first and second actuators, and so forth. Moreover, the processor 62 may include multiple microprocessors, one or more "general-purpose" microprocessors, one or more special-purpose microprocessors, and/or one or more application specific integrated circuits (ASICS), or some combination thereof. For example, the processor 62 may include one or more reduced instruction set (RISC) processors.

The memory device 64 may include a volatile memory, such as random access memory (RAM), and/or a nonvolatile memory, such as read-only memory (ROM). The memory device 64 may store a variety of information and may be used for various purposes. For example, the memory device 64 may store processor-executable instructions (e.g., firmware or software) for the processor 62 to execute, such as instructions for identifying the rough soil profile, for controlling the first and second actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for identifying the rough soil profile, etc.), and any other suitable data.

As previously discussed, the sensor 46 is configured to emit an output signal toward a region of the soil surface and to receive a return signal indicative of the profile of the soil surface within the region. The sensor 46 may include any suitable type of sensor configured to emit an output signal toward the soil surface and to receive a return signal indicative of the profile of the soil surface. In certain embodiments, the sensor may include an infrared sensor configured to emit an infrared signal toward the soil surface and to receive a return infrared signal from the soil surface. Furthermore, in certain embodiments, the sensor may include a radio detection and ranging (RADAR) sensor (e.g., millimeter wave (MMW) scanner, etc.) configured to emit a radio frequency signal toward the soil surface and to receive a return radio frequency signal from the soil surface. In addition, in certain embodiments, the sensor may include a lidar sensor (e.g., time-of-flight scanning laser, etc.) configured to emit a light signal toward the soil surface and to receive a return light signal from the soil surface. By way of further example, in certain embodiments, the sensor may include an ultrasonic sensor configured to emit an ultrasonic signal toward the soil surface and to receive a return ultrasonic signal from the soil surface. Furthermore, in certain embodiments, the sensor may include a capacitive sensor configured to emit an electric signal/field toward the soil surface and to receive a return electric signal from the soil surface (e.g., in the form of a change to the emitted electric signal/field).

While a single sensor 46 is shown in the illustrated embodiment, the illustrated sensor 46 may be representative of multiple sensors (e.g., spaced apart from one another along a lateral axis of the agricultural tillage implement). In embodiments including multiple sensors 46, each sensor may be directed toward a respective portion of the region of the soil surface. As previously discussed, the region is positioned rearward of each ground engaging tool of the agricultural tillage implement along the direction of travel. Each sensor 46 is configured to emit an output signal toward the respective portion of the region and to receive a return signal indicative of a profile of the soil surface within the respective portion of the region. For example, the portions of the region may be non-overlapping and extend along the lateral axis of the agricultural tillage implement (e.g., each portion may be in contact with an adjacent portion). By way of further example, at least two of the regions may partially overlap one another.

In the illustrated embodiment, the first actuator 56 includes a hydraulic cylinder configured to control the position of the hitch of the hitch assembly relative to the implement frame along the vertical axis. In addition, the soil monitoring system 12 includes a first valve assembly 66 configured to control a flow of fluid (e.g., hydraulic fluid) to the first actuator 56/hydraulic cylinder. Accordingly, the controller 60 is communicatively coupled to the first actuator 56 via the first valve assembly 66. The first valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the first actuator 56/hydraulic cylinder (e.g., from a fluid source) and, in certain embodiments, from the first actuator 56/hydraulic cylinder (e.g., to a fluid tank, etc.). The valve assembly may be located on the agricultural tillage implement, the valve assembly may be located on the work vehicle towing the agricultural tillage implement, or the valve assembly may be distributed between the agricultural tillage implement and the work vehicle. While the first actuator 56 includes a single hydraulic cylinder in the illustrated embodiment, in other embodiments, the first actuator may include multiple hydraulic cylinders (e.g., 2, 3, 4, 5, 6, etc.). Furthermore, in certain embodiments, the first actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the second actuator 58 includes a hydraulic cylinder configured to control the position of the respective wheel assembly relative to the implement frame along the vertical axis. In addition, the orientation control system 12 includes a second valve assembly 68 configured to control a flow of fluid (e.g., hydraulic fluid) to the second actuator 58/hydraulic cylinder. Accordingly, the controller 60 is communicatively coupled to the second actuator 58 via the second valve assembly 68. The second valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the second actuator 58/hydraulic cylinder (e.g., from a fluid source) and, in certain embodiments, from the second actuator 58/hydraulic cylinder (e.g., to a fluid tank, etc.). The valve assembly may be located on the agricultural tillage implement, the valve assembly may be located on the work vehicle towing the agricultural tillage implement, or the valve assembly may be distributed between the agricultural tillage implement and the work vehicle. While the second actuator 58 includes a single hydraulic cylinder in the illustrated embodiment, in other embodiments, the second actuator may include multiple hydraulic cylinders (e.g., 2, 3, 4, 5, 6, etc.). Furthermore, in certain embodiments, the second actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the soil monitoring system 12 includes a user interface 70 communicatively coupled to the controller 60. The user interface 70 may include any suitable control(s) configured to enable an operator to interact with (e.g., provide input to, etc.) the soil monitoring system 12, such as a keyboard, a mouse, one or more switches, one or more buttons, and one or more knobs. For example, the operator may input the threshold value(s), the operator may input other suitable parameters, the operator may manually control the actuator(s), or a combination thereof. The user interface, in turn, may output signal(s) to the controller indicative of the operator input(s). In the illustrated embodiment, the user interface includes a display 72 configured to present information to the operator. In addition, in certain embodiments, the display may include a touchscreen interface configured to enable an operator to provide input to the controller via the display.

In certain embodiments, the controller 60 is configured to identify a rough soil profile in response to determining that at least one variation in the profile of the soil surface within the region is greater than a first threshold value. In certain embodiments, the first threshold value is 10 cm. However, in other embodiments, the first threshold value may be 20 cm, 15 cm, 10 cm, or 5 cm. Furthermore, in certain embodiments, the controller may identify the rough soil profile in response to determining that a number of variations in the profile of the soil surface within the region is greater than a second threshold value. In certain embodiments, the second threshold value is 5. However, in other embodiments, the second threshold value may be 1, 2, 3, 4, 5, 10, 15, 20, 25, or 30. As previously discussed, each vertical difference between a baseline soil profile and a respective point along the profile of the soil surface that is greater than a third threshold value corresponds to a respective variation in the profile of the soil surface. In certain embodiments, the third threshold value is 5 cm. However, in other embodiments, the third threshold value may be 2 cm, 3 cm, 4 cm, 10 cm, or 15 cm.

In certain embodiments, the controller is configured to identify the rough soil profile only in response to determining that at least one variation in the profile of the soil surface within the region is greater than the first threshold value. Furthermore, in certain embodiments, the controller is configured to identify the rough soil profile only in response to determining that a number of variations in the profile of the soil surface within the region is greater than the second threshold value. In addition, in certain embodiments, the controller is configured to identify the rough soil profile only in response to determining that at least one variation in the profile of the soil surface within the region is greater than the first threshold value and a number of variations in the profile of the soil surface within the region is greater than the second threshold value. Furthermore, in certain embodiments, the controller may be configured to identify the rough soil profile in response to other suitable condition(s) (e.g., width of at least one variation exceeding a threshold value, density of variations exceeding a threshold value, etc.).

In certain embodiments, the controller 60 is configured to output a control signal to the first and second actuators indicative of instructions to adjust a penetration depth of at least one ground engaging tool in response to identifying the rough soil profile. For example, in response to identifying the rough soil profile, the controller may instruct the first actuator 56 and the second actuator 58 to lower the implement frame relative to the soil surface, thereby increasing the penetration depth of the ground engaging tools. As a result, the ground engaging tools may increase the degree/magnitude of tillage, thereby reducing the roughness of the soil surface. Furthermore, in certain embodiments, the controller may be configured to reduce the penetration depth (e.g., to the pre-adjustment penetration depth) of one or more ground engaging tools after a certain duration (e.g., to reduce the draft load on the work vehicle). In such embodiments, the controller may subsequently increase the penetration depth of the one or more ground engaging tools in response to identifying the rough soil profile.

Figure 3:
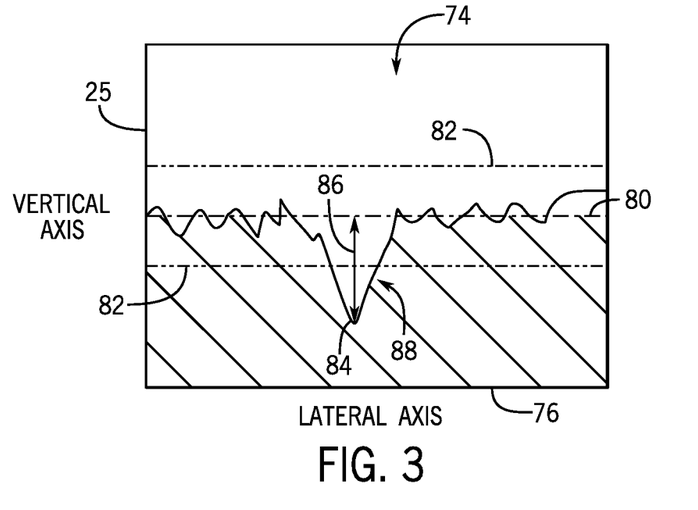
FIG. 3 is a cross-sectional view of an embodiment of a soil profile.

FIG. 3 is a cross-sectional view of an embodiment of a soil profile 74. In the illustrated embodiment, the soil profile 74 is a one-dimensional soil profile that extends along a lateral axis 76 of the agricultural tillage implement within the region, as represented by the x-axis. In addition, the y-axis represents the vertical axis 25 relative to a baseline soil profile 80. In certain embodiments, the baseline soil profile 80 corresponds to the average position of the soil profile 74 along the vertical axis 25 within the region. However, in other embodiments, the baseline soil profile may correspond to another suitable baseline, such as the average vertical position of the soil profile within a field, a reference position, etc. While the soil profile is one-dimensional in the illustrated embodiment, in other embodiments, the soil profile may be two-dimensional and extend along the direction of travel of the agricultural tillage implement.

As previously discussed, each vertical difference between the baseline soil profile 80 and a respective point along the soil profile 74 (e.g., profile of the soil surface) that is greater than the third threshold value corresponds to a respective variation in the soil profile 74. The third threshold value is represented by dashed lines 82. As illustrated, a difference 86 along the vertical axis 25 between the baseline soil profile 80 and one point 84 within the soil profile 74 is greater than the third threshold value 82. Accordingly, the illustrated soil profile 74 has a single variation 88. In the illustrated embodiment, the single variation 88 (e.g., the magnitude of the single variation along the vertical axis 25 relative to the baseline soil profile 80) is greater than the first threshold value. As such, the controller may identify the illustrated soil profile 74 as a rough soil profile. As used herein, "point" refers to a local maximum or local minimum within a sub-region, and "sub-region" refers to a local/isolated portion of the soil profile that exceeds the third threshold value.

Figure 4:
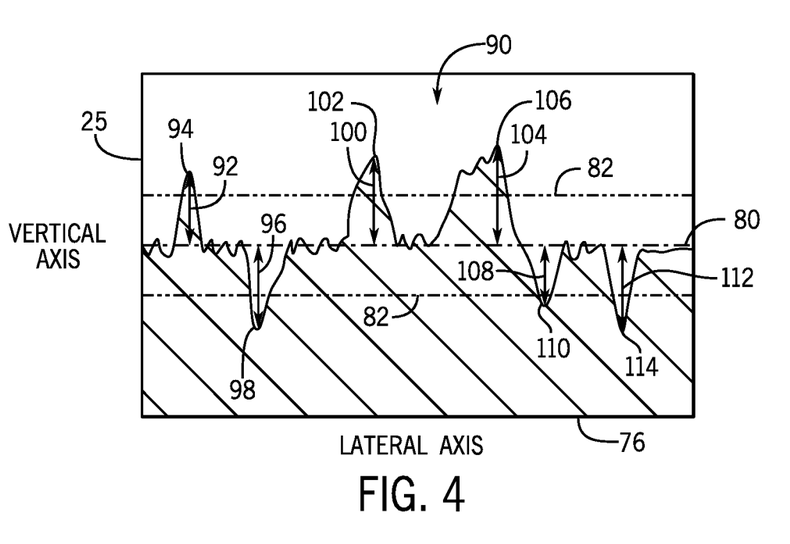
FIG. 4 is a cross-sectional view of another embodiment of a soil profile.

FIG. 4 is a cross-sectional view of another embodiment of a soil profile 90. As illustrated, a first difference 92 along the vertical axis 25 between the baseline soil profile 80 and a first point 94 along the soil profile 90 is greater than the third threshold value 82. In addition, a second difference 96 along the vertical axis 25 between the baseline soil profile 80 and a second point 98 along the soil profile 90 is greater than the third threshold value 82. Furthermore, a third difference 100 along the vertical axis 25 between the baseline soil profile 80 and a third point 102 along the soil profile 90 is greater than the third threshold value 82. Additionally, a fourth difference 104 along the vertical axis 25 between the baseline soil profile 80 and a fourth point 106 along the soil profile 90 is greater than the third threshold value 82. And, a fifth difference 108 along the vertical axis 25 between the baseline soil profile 80 and a fifth point 110 along the soil profile 90 is greater than the third threshold value 82. Furthermore, a sixth difference 112 along the vertical axis 25 between the baseline soil profile 80 and a sixth point 114 along the soil profile 90 is greater than the third threshold value 82. In certain embodiments, the controller may identify a rough soil profile in response to determining that the number of variations in the soil profile 90 exceeds a second threshold value. In certain embodiments, the second threshold value is 5. Accordingly, the controller may identify the illustrated soil profile as a rough soil profile.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . ." or "step for [perform]ing [a function]. . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A soil monitoring system for an agricultural tillage implement, comprising:
 a sensor configured to be coupled to a frame of the agricultural tillage implement and directed toward a region of a soil surface rearward of each ground engaging tool of the agricultural tillage implement along a direction of travel of the agricultural tillage implement, wherein the sensor is configured to emit an output signal toward the region of the soil surface and to receive a return signal indicative of a profile of the soil surface within the region; and
 a controller comprising a memory and a processor, wherein the controller is communicatively coupled to the sensor, the controller is configured to identify a rough soil profile in response to determining that at least one variation in the profile of the soil surface within the region is greater than a first threshold value, in response to determining that a number of variations in the profile of the soil surface within the region is greater than a second threshold value, or a combination thereof, and the controller is configured to output a monitoring signal in response to identifying the rough soil profile;
 wherein each vertical difference between a baseline soil profile and a respective point along the profile of the soil surface that is greater than a third threshold value corresponds to a respective variation in the profile of the soil surface.

2. The soil monitoring system of claim 1, wherein the sensor comprises an infrared sensor, a radio detection and ranging sensor, a lidar sensor, an ultrasonic sensor, or a capacitive sensor.

3. The soil monitoring system of claim 1, wherein the region is positioned at least 30 cm rearward of each ground engaging tool of the agricultural tillage implement along the direction of travel.

4. The soil monitoring system of claim 1, wherein the first threshold value is 10 cm.

5. The soil monitoring system of claim 1, wherein the second threshold value is 5.

6. The soil monitoring system of claim 1, wherein the third threshold value is 5 cm.

7. The soil monitoring system of claim 1, comprising a user interface communicatively coupled to the controller, wherein the user interface is configured to present an indication of the rough soil profile in response to receiving the monitoring signal.

8. The soil monitoring system of claim 1, wherein the controller is configured to output a control signal indicative of instructions to adjust a penetration depth of at least one ground engaging tool of the agricultural tillage implement in response to identifying the rough soil profile.

9. A soil monitoring system for an agricultural tillage implement, comprising:
 a plurality of sensors, wherein each sensor of the plurality of sensors is configured to be coupled to a frame of the agricultural tillage implement, each sensor of the plurality of sensors is configured to be directed toward a respective portion of a region of a soil surface, the region of the soil surface is positioned rearward of each ground engaging tool of the agricultural tillage implement along a direction of travel of the agricultural tillage implement, and each sensor of the plurality of sensors is configured to emit an output signal toward the respective portion of the region and to receive a return signal indicative of a profile of the soil surface within the respective portion of the region; and a controller comprising a memory and a processor, wherein the controller is communicatively coupled to the plurality of sensors, the controller is configured to identify a rough soil profile in response to determining that at least one variation in the profile of the soil surface within the region is greater than a first threshold value, in response to determining that a number of variations in the profile of the soil surface within the region is greater than a second threshold value, or a combination thereof, and the controller is configured to output a monitoring signal in response to identifying the rough soil profile;

wherein each vertical difference between a baseline soil profile and a respective point along the profile of the soil surface that is greater than a third threshold value corresponds to a respective variation in the profile of the soil surface.

10. The soil monitoring system of claim 9, wherein at least one sensor of the plurality of sensors comprises an infrared sensor, a radio detection and ranging sensor, a lidar sensor, an ultrasonic sensor, or a capacitive sensor.

11. The soil monitoring system of claim 9, wherein the region is positioned at least 30 cm rearward of each ground engaging tool of the agricultural tillage implement along the direction of travel.

12. The soil monitoring system of claim 9, comprising a user interface communicatively coupled to the controller, wherein the user interface is configured to present an indication of the rough soil profile in response to receiving the monitoring signal.

13. The soil monitoring system of claim 9, wherein the controller is configured to output a control signal indicative of instructions to adjust a penetration depth of at least one ground engaging tool coupled to the agricultural tillage implement in response to identifying the rough soil profile.

14. The soil monitoring system of claim 9, wherein the first threshold value is 10 cm.

15. The soil monitoring system of claim 9, wherein the third threshold value is 5 cm.

16. The soil monitoring system of claim 9, wherein the second threshold value is 5.

17. An agricultural tillage implement, comprising:
a frame configured to support a plurality of ground engaging tools;
a soil monitoring system, comprising:
a sensor coupled to the frame, wherein the sensor is directed toward a region of a soil surface rearward of the plurality of ground engaging tools along a direction of travel of the agricultural tillage implement, and the sensor is configured to emit an output signal toward the region of the soil surface and to receive a return signal indicative of a profile of the soil surface within the region;

a controller comprising a memory and a processor, wherein the controller is communicatively coupled to the sensor, the controller is configured to identify a rough soil profile in response to determining that at least one variation in the profile of the soil surface within the region is greater than a first threshold value, in response to determining that a number of variations in the profile of the soil surface within the region is greater than a second threshold value, or a combination thereof, and the controller is configured to output a monitoring signal in response to identifying the rough soil profile;

wherein each vertical difference between a baseline soil profile and a respective point along the profile of the soil surface that is greater than a third threshold value corresponds to a respective variation in the profile of the soil surface.

18. The agricultural tillage implement of claim 17, comprising:
a wheel assembly movably coupled to the frame; and
a hitch assembly movably coupled to the frame, wherein the hitch assembly comprises a hitch configured to engage a corresponding hitch of a work vehicle;
wherein the soil monitoring system comprises:
a first actuator coupled to the hitch assembly, wherein the first actuator is configured to control a position of the hitch of the hitch assembly relative to the frame along a vertical axis; and
a second actuator coupled to the wheel assembly, wherein the second actuator is configured to control a position of the wheel assembly relative to the frame along the vertical axis;
wherein the controller is configured to output a control signal to the first and second actuators indicative of instructions to adjust a penetration depth of at least one ground engaging tool of the plurality of ground engaging tools in response to identifying the rough soil profile.

19. The agricultural tillage implement of claim 17, wherein the sensor comprises an infrared sensor, a radio detection and ranging sensor, a lidar sensor, an ultrasonic sensor, or a capacitive sensor.

20. The agricultural tillage implement of claim 17, wherein the soil monitoring system comprises a user interface communicatively coupled to the controller, and the user interface is configured to present an indication of the rough soil profile in response to receiving the monitoring signal.

* * * * *